United States Patent
Boyle

(10) Patent No.: US 11,504,902 B2
(45) Date of Patent: Nov. 22, 2022

(54) METHODS AND APPARATUS TO IDENTIFY ADDITIVELY MANUFACTURED PARTS

(71) Applicant: Fisher Controls International LLC, Marshalltown, IA (US)

(72) Inventor: Adam Taylor Boyle, St. Louis, MO (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 629 days.

(21) Appl. No.: 16/584,565

(22) Filed: Sep. 26, 2019

(65) Prior Publication Data

US 2020/0016828 A1    Jan. 16, 2020

Related U.S. Application Data

(63) Continuation of application No. 16/032,917, filed on Jul. 11, 2018, now Pat. No. 10,456,976.

(51) Int. Cl.
*B33Y 80/00* (2015.01)
*B29C 64/112* (2017.01)
(Continued)

(52) U.S. Cl.
CPC ............ *B29C 64/112* (2017.08); *B33Y 80/00* (2014.12); *B29C 64/10* (2017.08); *B29C 64/106* (2017.08); *B29C 64/118* (2017.08); *B29C 64/147* (2017.08); *B29C 64/153* (2017.08); *B29C 64/165* (2017.08); *B29C 64/40* (2017.08); *B29K 2995/0063* (2013.01); *B33Y 10/00* (2014.12); *G05B 2219/49013* (2013.01); *G05B 2219/49018* (2013.01); *G05B 2219/49021* (2013.01); *G05B 2219/49023* (2013.01);
(Continued)

(58) Field of Classification Search
CPC .................. B33Y 80/10; Y10T 428/24893
USPC ....................................................... 428/195.1
See application file for complete search history.

(56) References Cited

U.S. PATENT DOCUMENTS 6,363,606 B1    4/2002    Johnson et al.
10,456,976 B1   10/2019   Boyle
(Continued)

FOREIGN PATENT DOCUMENTS

EP    2837444 A1    2/2015
JP    2015077775 A  4/2015
(Continued)

OTHER PUBLICATIONS

International Searching Authority, "International Search Report," dated Nov. 8, 2019 in connection with International Patent Application No. PCT/US2019/041097, 7 pages.
(Continued)

*Primary Examiner* — Betelhem Shewareged
(74) *Attorney, Agent, or Firm* — Hanley, Flight & Zimmerman, LLC

(57) ABSTRACT

Methods and apparatus to identify additively manufactured parts are disclosed. An example apparatus includes a body, formed of layers layered substantially parallel to a base layer, composed of a first material having a first density, a first indicium embedded internally in the body as a void, and a second indicium on an external surface of the body, the second indicium aligning with the first indicium.

22 Claims, 7 Drawing Sheets

(51) Int. Cl.

| | |
|---|---|
| B33Y 10/00 | (2015.01) |
| B29C 64/147 | (2017.01) |
| B29C 64/118 | (2017.01) |
| B29C 64/153 | (2017.01) |
| B29C 64/40 | (2017.01) |
| B29C 64/10 | (2017.01) |
| B29C 64/106 | (2017.01) |
| B29C 64/165 | (2017.01) |
| G06K 7/14 | (2006.01) |
| G06K 19/06 | (2006.01) |

(52) U.S. Cl.
CPC .............. *G05B 2219/49024* (2013.01); *G05B 2219/49026* (2013.01); *G06K 7/1413* (2013.01); *G06K 7/1417* (2013.01); *G06K 19/06028* (2013.01); *G06K 19/06037* (2013.01); *G06K 19/06065* (2013.01); *G06K 19/06103* (2013.01); *Y10T 428/24893* (2015.01)

(56) References Cited

U.S. PATENT DOCUMENTS

| | | |
|---|---|---|
| 2012/0183701 A1 | 7/2012 | Pilz et al. |
| 2015/0170013 A1 | 6/2015 | Wilson et al. |
| 2016/0257074 A1 | 9/2016 | Levine et al. |
| 2016/0368054 A1 | 12/2016 | Ng et al. |
| 2018/0293476 A1 | 10/2018 | Gold |
| 2020/0016828 A1* | 1/2020 | Boyle .................. G06K 7/1413 |

FOREIGN PATENT DOCUMENTS

| | | |
|---|---|---|
| WO | 2015091489 A1 | 6/2015 |
| WO | 2017079159 A1 | 5/2017 |

OTHER PUBLICATIONS

International Searching Authority, "Written Opinion," dated Nov. 8, 2019 in connection with International Patent Application No. PCT/US2019/041097, 7 pages.

Mayer et al., "3D Fluorescence-Based Security Features by 3D Laser Lithography," Advanced Materials Technologies, Sep. 21, 2017, pp. 1, [http://onlinelibrary.wiley.com/doi/abs/10.1002/admt_201700212, retrived on Mar. 21, 2018] (2 pages).

Ward, "3D Printing and Counterfeit Goods," The Pinkerton Difference, May 14, 2015, pp. 1-5. [https://www.pinkerton.com/blog/3d-printing-and-counterfeit-goods/, retrieved on Mar. 21, 2018] (8 pages).

Brown et al., "3D Opportunity and Cyber Risk Management," Additive Manufacturing Secures the Thread, Aug. 23, 2016, pp. 1-29. [https://www2.deloitte.com/insights/us/en/focus/3d-opportunity/3d-printing-cyber-risk-management.html, retrieved Mar. 21, 2018] (35 pages).

Parker, "Cubichain tackles 3D printing counterfeiting issues with blockchain technology," Brave New Coin, Dec. 10, 2016, pp. 1-29. [http://bravenewcoin.com/news/indias-idea-about-a-cashless-society-is-not-the-reality/, retrieved on Mar. 21, 2018] (30 pages).

Kennedy et al., "Enhanced anti-counterfeiting measures for additive manufacturing: coupling lanthanide nanomaterial chemical signatures with blockchain technology," Journal of Materials Chemistry C, 2017, pp. 1-2. [http://pubs.rsc.org/-/content/articlelanding/2017/tc/c7tc03348f#!divAbstract, retrived on Mar. 21, 2018] (5 pages).

Yuan, "How Do You Stop 3D Printed Counterfeits?" ECN Magazine, Apr. 28, 2016, pp. 1-3. [http://ecnmag.com/article/2016/04/how-do-you-stop-3d-printed-counterfeits, retrieved Mar. 21, 2018] (6 pages).

Petch, "Yargh! Piracy and Intellecutal Property in the 3D-Printing Era," Sep. 22, 2016, pp. 1-8. [http://autodesk.com/reshift/3d-printing-intellectual-property/, retrieved on Oct. 23, 2018] (9 pages).

Kucinski, "Protecting additive manufacturing's digital thread," Aug. 1, 2017, pp. 1-2. [http;//articles.sae.org/15543/, retrieved on Mar. 21, 2018] (14 pages).

United States Patent and Trademark Office, "Restriction Requirement," dated Dec. 31, 2018 in connection with U.S. Appl. No. 16/032,917, 7 pages.

United States Patent and Trademark Office, "Non-Final Office Action," dated Mar. 5, 2019 in connection with U.S. Appl. No. 16/032,917, 10 pages.

United States Patent and Trademark Office, "Notice of Allowance," dated Jun. 19, 2019 in connection with U.S. Appl. No. 16/032,917, 5 pages.

* cited by examiner

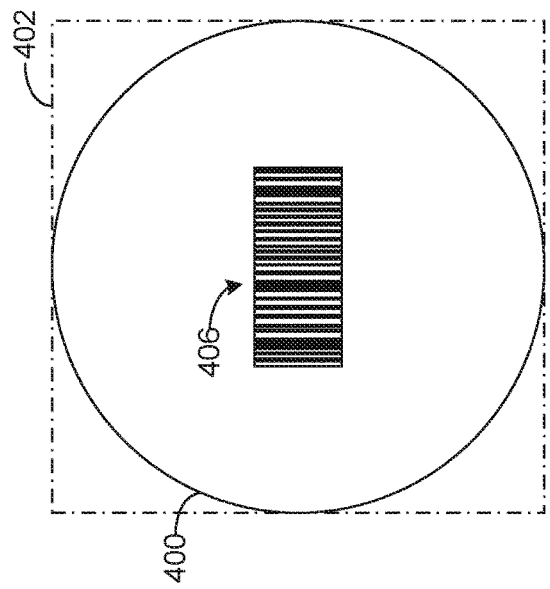
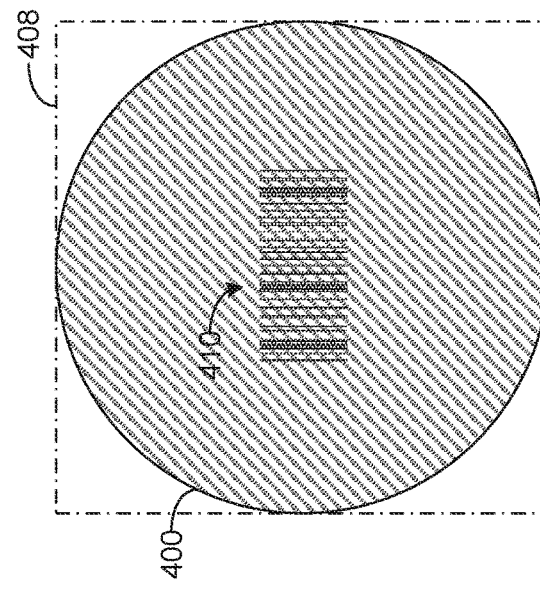
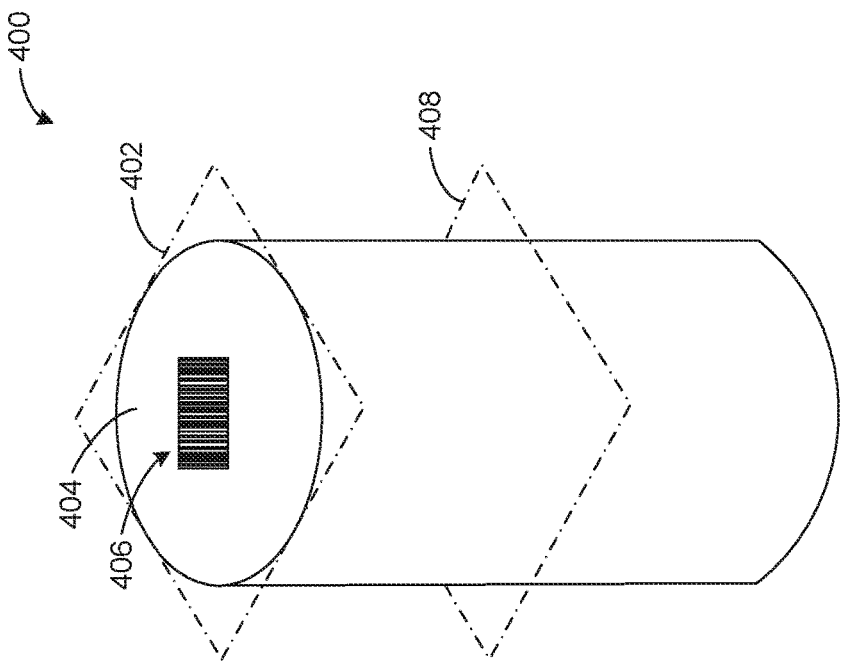

US 11,504,902 B2

METHODS AND APPARATUS TO IDENTIFY ADDITIVELY MANUFACTURED PARTS

RELATED APPLICATION

This patent arises from a continuation of U.S. patent application Ser. No. 16/032,917, which was filed on Jul. 11, 2018. U.S. patent application Ser. No. 16/032,917 is hereby incorporated herein by reference in its entirety.

FIELD OF THE DISCLOSURE

This disclosure relates generally to part authentication and, more particularly, to methods and apparatus to identify additively manufactured parts.

SUMMARY

An example apparatus disclosed herein includes a body, formed of layers layered substantially parallel to a base layer, composed of a first material having a first density, a first indicium embedded internally in the body as a void, and a second indicium on an external surface of the body, the second indicium aligning with the first indicium.

An example apparatus disclosed herein includes a body, formed of layers layered substantially parallel to a base layer, the layers deposited using a binder jetting technique, composed of a first material, and an indicium embedded internally in the body as a void, the void filled with a second material, wherein the second material is a powder material that is not completely fused, wherein the first material is fused with a first adhesive and the second material is not completely fused with a second adhesive.

BACKGROUND

Additive manufacturing (AM) refers to manufacturing techniques that build three-dimensional (3D) objects by repeatedly layering material on top of and substantially parallel to a base layer. Additive manufacturing allows for 3D digital models of parts (e.g., generated by a 3D scanner, created using computer-aided design (CAD) software, etc.) to be produced rapidly without the need for custom tooling. Additive manufacturing techniques include material jetting, binder jetting, material extrusion, powder bed fusion (PBF), and sheet lamination. Depending on the specific technique used, additively manufactured parts may be composed of metals, plastic, polymers, organic compounds and/or ceramics.

3D scanners allow for physical objects to be analyzed to determine the shape and characteristics of the objects. Some 3D scanners may be used to generated 3D digital models of the scanned physical objects and, thus, reverse engineer existing parts

BRIEF DESCRIPTION OF THE DRAWINGS

FIG. 4A is an illustration of an example additively manufactured part with an external surface indicium on which the teachings of this disclosure may be implemented.

FIG. 4B is a top view of the example additively manufactured part of FIG. 4A.

FIG. 4C is a cross-sectional view of the example additively manufactured part of FIG. 4A.

Figure 1:
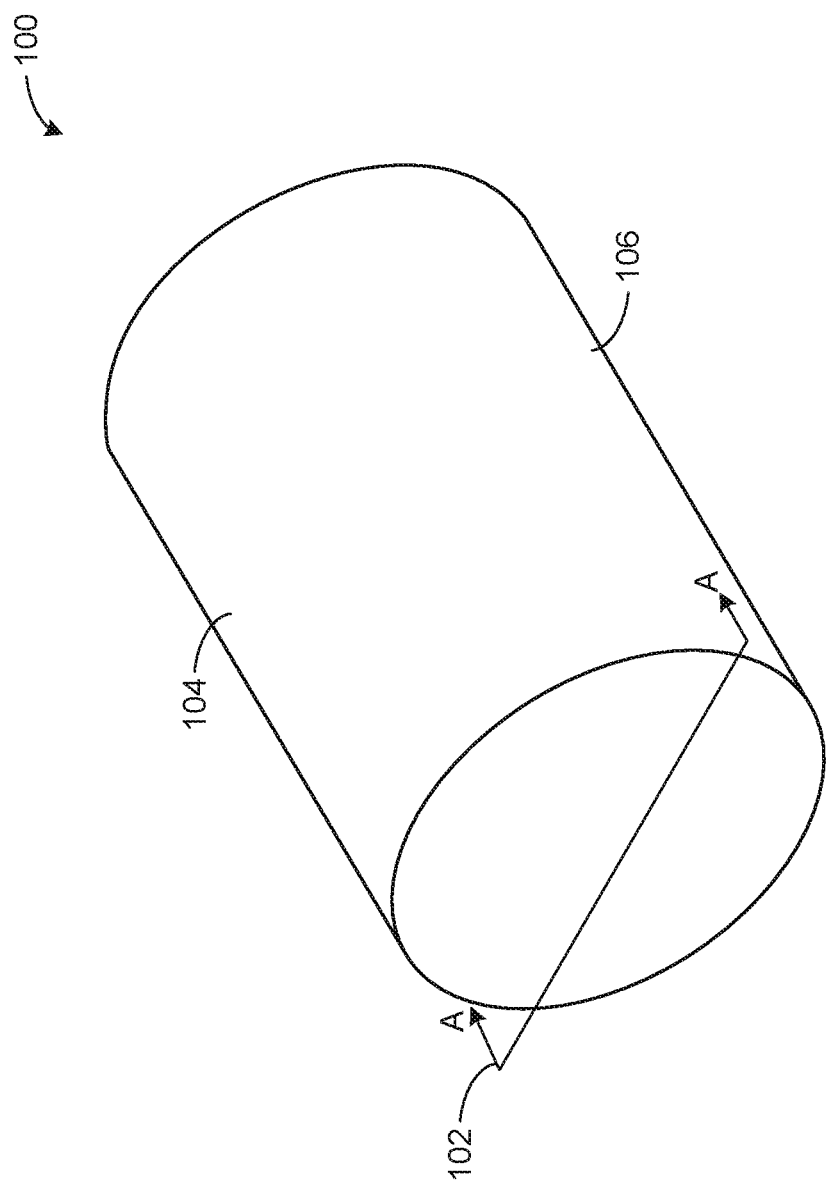
FIG. 1 is an illustration of an example additively manufactured part with which the teachings of this disclosure may be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

With the continuing advancements of 3D scanners and additive manufacturing techniques, counterfeit parts have become more common. For example, manufacturers of counterfeit parts may use 3D scanners to generate 3D models of authentic parts and then produce those parts using additive manufacturing techniques. In many examples, while these parts may look like authentic parts, counterfeit parts may suffer from reduced quality, shorter lifecycles and/or other detrimental aspects.

In the event of a part failure, it may be useful to determine if a part is authentic or counterfeit, particularly where liability needs to be determined. Historically, external indicia have been used to authenticate parts. As used herein, an indicium refers to a physical sign, indication or mark that may be used to identify a part. Examples of external indicia include watermarks, serial numbers, and holograms. In some examples, external indicia may be adhered to the surface of a part (e.g., a sticker, etc.). In other examples, external indicia may be etched into an external surface of a part. External indicia, however, are visibly identifiable without the use of specialty equipment (e.g., an X-ray scanner), which allows manufacturers of counterfeit parts to replicate external indicia.

Examples disclosed herein overcome the above-noted difficulties by embedding indicia within parts manufactured using additive manufacturing. In some examples disclosed herein, embedded indicia are voids within additively manufactured parts. In other examples disclosed herein, an embedded indicium is composed of a different material with a different density than the main body of the part. In some examples, embedded indicia are composed of the same material in a difficult physical state as the body of the part. In some examples disclosed herein, an embedded indicium is at least one of a logo, a serial number, a trademark, a barcode or a Quick Response (QR) code. In some examples disclosed herein, an embedded indicium may align with a second indicium. In these examples, the alignment of the embedded indicium and the second indicium may be used to identify the part. In some examples, the second indicium can be an external indicium.

The teachings disclosed herein can be implemented on a part manufactured using any suitable additive manufacturing technique. For example, parts manufactured using powder bed fusion (PDF) can include embedded indicia composed of partially fused or unfused powder. As used herein, "partially fused powder" refers to powder material that is not melted to the full density of the completely fused material. Partially fused powder can be characterized by a porosity detectable by X-ray scanning. In other examples, PBF parts can include embedded indicia as a void within the body of the part. The teachings disclosed herein can also be used with material jetting techniques and material extrusion techniques. For example, the main body of parts manufactured using additive manufacturing techniques can use a first material (e.g., a first plastic or polymer) and the indicium can be a void or a second material (e.g., a second plastic or polymer). The teaching disclosed herein can also be used with sheet lamination techniques.

FIG. 1 is an illustration of an example additively manufactured part 100 with which the teachings of this disclosure may be implemented. The additively manufactured part 100 is bisected by sectional plane 102. In the illustrated example, the part 100 is composed of a first material 104. Alternatively, the part 100 can be partly composed of the material 104. For example, the part 100 can be used in an application where counterfeiting is common and product failure has significant ramifications (e.g., high pressure control systems, aviation, defense systems, medical implants, etc.). In some examples, the part 100 can be used in any suitable application (e.g., architecture, art, etc.). In some examples, the part 100 can be designed to accommodate internal voids and/or density variations caused by embedded indicia. As used herein, voids are empty (e.g., lacking manufacturing material) enclosed regions in a part. In some examples, voids may have one or more small escape holes allowing material to be removed to form the void. In some illustrated examples of this disclosure (e.g., FIGS. 2 and 4C), the internal indicia (e.g., the indicia 212 of FIG. 2, etc.) are formed by a material (e.g., the material 202 of FIG. 2). In other examples, the internal indicia can instead be formed by one or more voids. In other examples, the internal indicia can be formed by a combination of one or more materials and voids.

The example part 100 is manufactured using additive manufacturing techniques. In some examples, a body 106 of the part 100 is formed of substantially parallel layers of the first material 104. For example, the part 100 can be manufactured using PBF. In some examples, the part 100 can instead be manufactured using any (or combination of) other suitable additive manufacturing techniques (e.g., VAT photopolymerization, material jetting, binder jetting, material extrusion, powder bed fusion, sheet lamination, directed energy deposition, etc.). In some examples, the part 100 can instead be manufactured by hybrid manufacturing techniques (e.g., techniques that include standard/subtractive manufacturing techniques and additive manufacturing techniques). In some examples, the part 100 can be subjected to any suitable post-processing (e.g., sanding, painting, etc.). In some examples, the part 100 can be a component of an assembly of parts and/or a portion of a larger part.

The first material 104 can be any suitable material. In some examples, the selection of the first material 104 may depend on what additive manufacturing technique is used to manufacture the part 100. For example, the first material 104 can be a polymer, plastic, composite, metal, organic material, etc. In some examples, the part 100 can be composed of one or more other material(s) in addition to the first material 104. Alternatively, the entire part 100 can instead be composed of the first material 104.

Figure 2:
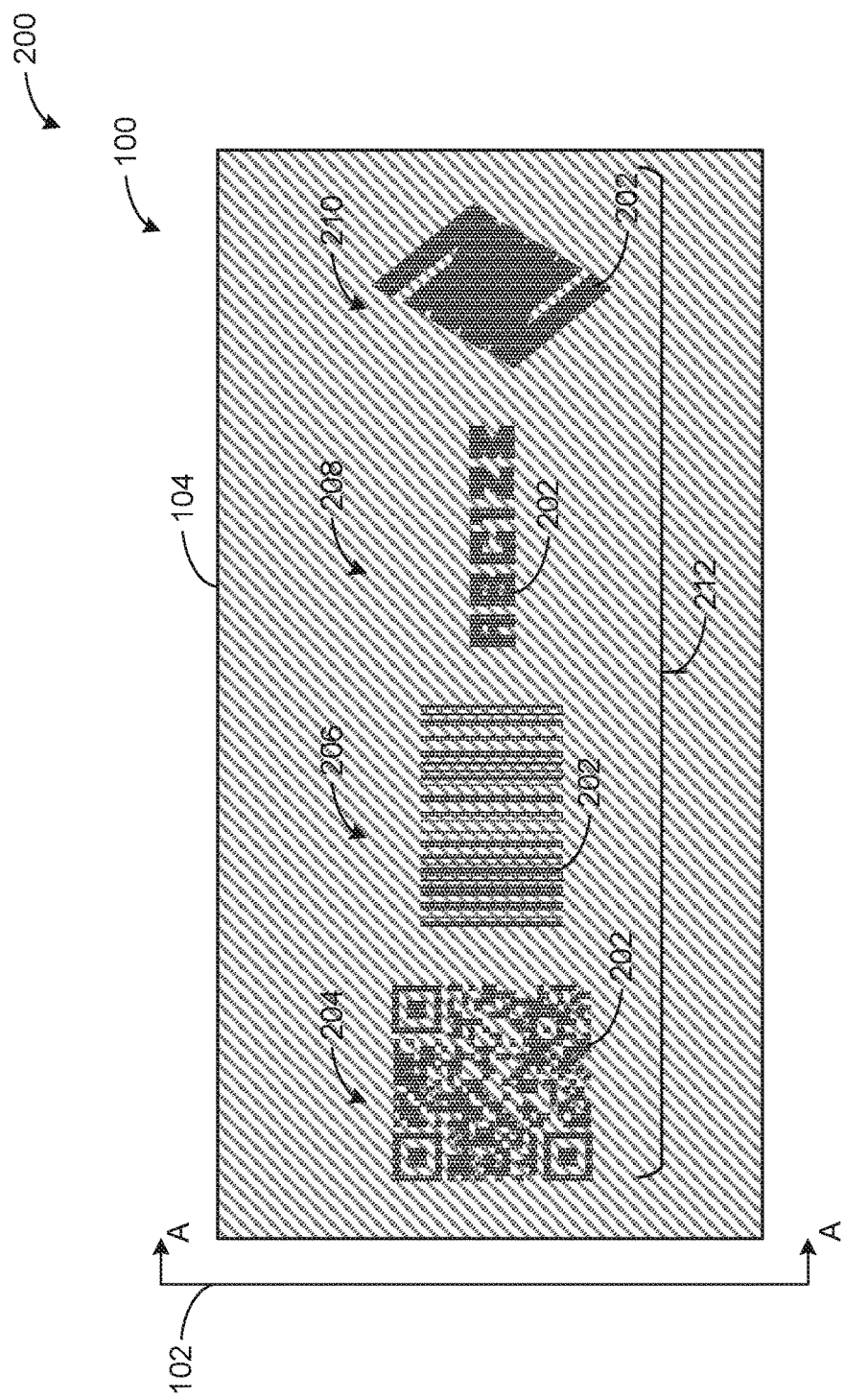
FIG. 2 is a cross-sectional view of the example additively manufactured part of FIG. 1 with embedded identification indicia.

FIG. 2 is a cross-sectional view 200 of the example additively manufactured part 100 of FIG. 1 with embedded identification indicia 212 visible along the sectional plane 102. In the illustrated example, the cross-sectional view 200 of the part 100 depicts the body 106 of the part 100 being composed of the first material 104. In some examples, the part 100 may have one or more of the illustrated indicia 212. In some examples, the indicia 212 may be partly or completely composed of a second material 202. The example second material 202 can have a different density than the first material 104. In other examples, the second material 202 may have the same density as the first material 104 and be distinguishable from the first material 104 by another means (e.g., color, radioactivity, grain orientation, etc.).

The example part 100 includes one or more of the example indicia 212. In the illustrated example, the indicia 212 include an example QR code indicium 204, an example barcode indicium 206, an example serial number indicium 208, and an example logo indicium 210. In other examples, the indicia 212 can include any other suitable identifiable marks. In some examples, the indicia 212 can be any suitable 3D shape. In some examples, the indicia 212 are composed of one or more other materials (e.g., the first material, a second material 202, etc.). In other examples, the indicia 212 can instead be voids in the part 100. In some examples, information to identify the part 100 can be encoded in the structure(s) of the indicia 212. For example, digital information can be encoded in the indicia 212 (e.g., the barcode indicium 206, the QR indicium 204, etc.). Additionally or alternatively, the indicia can contain optical information interpretable without the use of a digital decoder (e.g., the serial number indicium 208, the logo indicium 210). In some examples, the indicia 212 can be used to identify the part 100 by any suitable means (e.g., an ordering of materials, a 2D projection on a plane, the 3D structure, an orientation to a feature of the part 100 to the indicia 212, an orientation with other indicia of the part 100, etc.). In some examples, the indicia 212 may be detected via scanning (e.g., using an X-ray scanner, etc.) or physical means (e.g., cutting the part 100, etc.).

The example QR code indicium 204 is a type of matrix code that allows for information to be encoded in a binary matrix. In other examples, any other suitable encoding scheme can be used for the encoding matrix. In the illustrated example, the QR code indicium 204 is composed of the first material 104 and the second material 202 arranged as rectangle prisms (perpendicular to the sectional plane 102) in the matrix. In other examples, the first material 104 and the second material 202 can be any other suitable shape to create the QR code indicium 204. In some examples, the QR code indicium 204 can instead be formed by one or more voids in the part 100. In some examples, the QR Code indicium 204, when scanned by an X-ray scanner, can contain information that can be used to verify the authenticity of the part 100. In other examples, the QR code indicium 204 can contain any other suitable information (e.g., link to a website, etc.).

The example barcode indicium 206 is a series of parallel rectangular prisms of varying widths and spacing that be used to physically represent digital data (e.g., bits). In other examples, the barcode indicium 206 can be any suitable 3D shape to form the 2D cross-section illustrated in the example cross-sectional view 200 of FIG. 2. In the illustrated example, the barcode indicium 206 includes rectangular prisms composed of the second material 202. In other examples, the barcode indicium 206 can instead be one or more voids within the part 100. In some examples, the barcode indicium 206 can be of any other suitable shape. In some examples, the barcode indicium 206, when scanned by an X-ray scanner, can contain information that can be used to verify the authenticity of the part 100 (e.g., serial number, etc.).

In the illustrated example, the serial number indicium 208 is a series of block characters composed of the second material 202. In other examples, the serial number 208 is instead formed by one or more voids within the part 100. In some examples, the serial number formed by the serial number indicium 208 can be used to identify the part 100. In some examples, the serial number indicium 208 can be any suitable string including letters, numbers and/or symbols. The example serial number indicium 208 can be any suitable 3D shape to form the cross-section illustrated in the sectional view 200.

In the illustrated example, the logo indicium 210 is a graphic mark, emblem, or symbol composed of the second material 202. In other examples, the logo indicium 210 can instead be formed by one or more voids within the part 100. For example, the logo indicium 210 can be a logo of the manufacturer of the part. In other examples, the logo indicium 210 can be any other suitable logo to be used to identify the part 100. The example logo indicium 210 can any suitable 3D shape to form the cross-section illustrated in the cross-sectional view 200. In some examples, the logo indicium 210 can contain additional information (e.g., a barcode, serial number, etc.) readable by an X-ray scanner.

Figure 3:
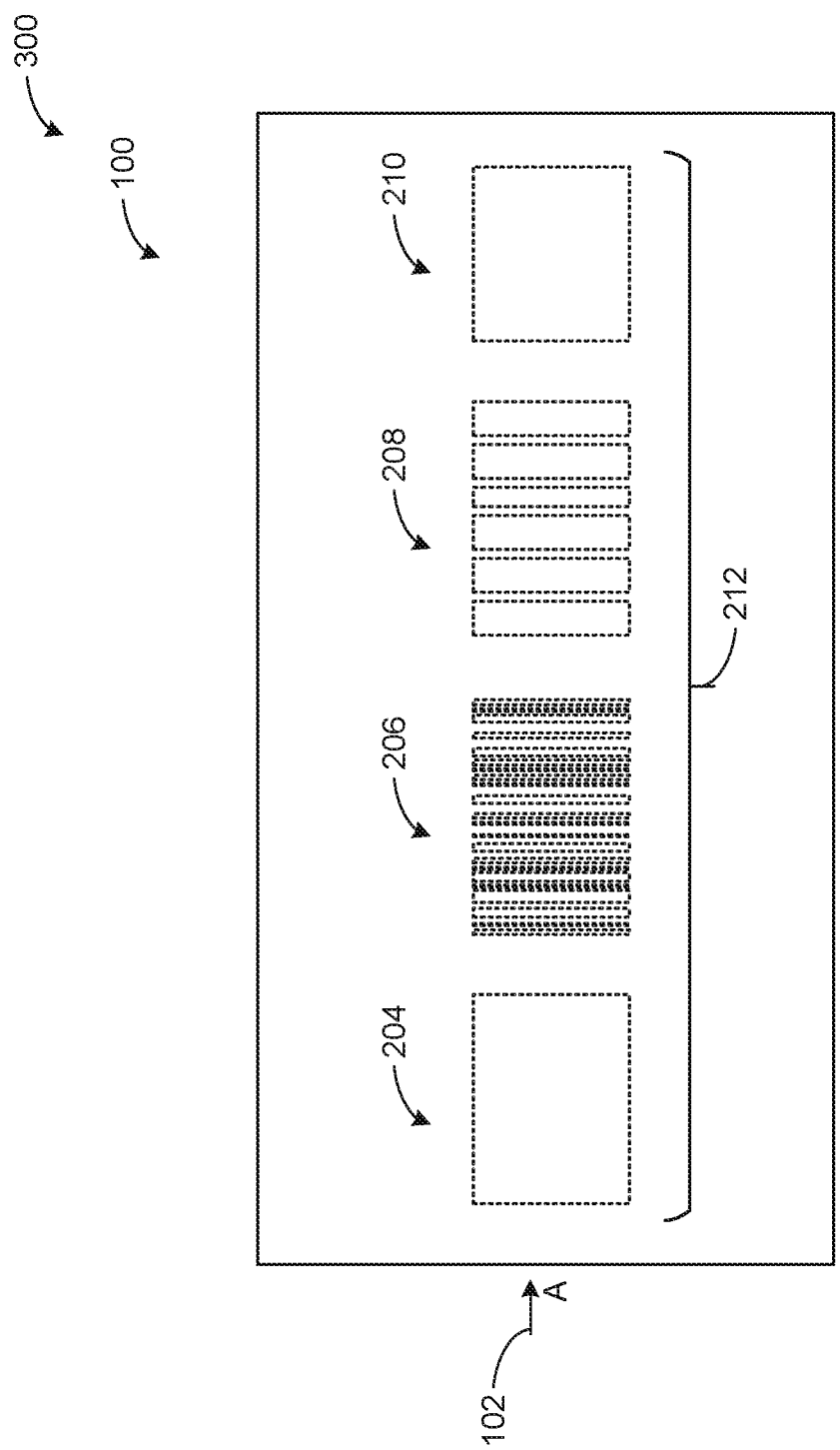
FIG. 3 is a side view of the example additively manufactured part of FIG. 1 with embedded identification indicia.

FIG. 3 is a side view 300 of the example additively manufactured part 100 of FIG. 1 with embedded identification indicia 212. All of the embedded indicia 212 (e.g., the indicia 204-210) have a depth in a plane perpendicular to the cross-sectional plane 102. In some examples, the embedded indicia 212 are rectangular prisms. In other examples, the embedded indicia 212 can have any other suitable 3D shape (e.g., conical, triangular, pyramidal, cylindrical, etc.). In some examples, the embedded indicia 212 can be composed of a single layer of material.

FIG. 4A is an illustration of an example additively manufactured part 400 with an example external surface indicium 406 in which the teachings of this disclosure may be implemented. An example plane 402 (FIG. 4B) is coplanar to a surface 404 of the part 400. The example external surface indicium 406 is deposited on the surface 404 of the part 400. An example intersecting plane 408 (FIG. 4C) intersects the part 400 and is parallel to the surface 404 and example plane 402.

The part 400 is manufactured using additive manufacturing techniques. For example, the part 400 may be manufactured using PBF. In some examples, the part 400 can instead be manufactured using any (or combination of) other suitable additive manufacturing techniques (e.g., VAT photopolymerization, material jetting, binder jetting, material extrusion, powder bed fusion, sheet lamination, directed energy deposition, etc.). In some examples, the part 400 can instead be manufactured by hybrid manufacturing techniques (e.g., techniques that include standard/subtractive manufacturing techniques and additive manufacturing techniques). In some examples, the part 400 can go through any suitable post-processing (e.g., sanding, painting, etc.). In some examples, the part 400 can be a component of an assembly of parts and/or a portion of a larger part.

The intersecting plane 408 intersects with the part 400 to define a cross-section of the part 400. In the illustrated example, the intersecting plane 408 can intersect an embedded indicium (e.g., the indicium 410 of FIG. 4C) and is parallel to the plane 402 and surface 404. In other examples, the plane 404 can have any other relationship with surface 404 (e.g., at an angle, orthogonal, etc.).

FIG. 4B is a top view of the example additively manufactured part 400 of FIG. 4A. In the illustrated example, the example surface 404 of the part 400 is the top surface of the part. In other examples, the example surface 404 of the part 400 may be any other external surface of the part 400. In some examples, the surface 404 is a curved surface (e.g., non-planar).

The surface indicium 406 is a deposited on the surface 404 of the part 400. For example, the external surface indicium 406 can be a hologram, watermark, barcode, and/or any other suitable means for identifying a part. In some examples, the external surface indicium 406 can be an identifiable symbol (e.g., a logo, etc.). The example external surface indicium 406 can be adhered to a surface of the part 400 using an adhesive (e.g., a sticker, etc.). In some examples, the external surface indicium 406 can be a physical modification to a surface of the part 400 (e.g., an etching, a watermark, etc.). Additionally or alternatively, the example external surface indicium 406 can be any single or combination of features on the part 400. In some examples, the surface indicium 406 can be formed during the additive manufacturing of the part 400. In some examples, the surface indicium 406 can be formed during post processing of the part 400.

FIG. 4C is a cross-sectional view of the example additively manufactured part 400 of FIG. 4A showing an alignment of an embedded identification indicium 410 with the external surface indicium 406 of FIG. 4B. The example embedded identification indicium 410 can be one or more voids within the part 400. Additionally or alternatively, the embedded indicium 410 can be formed using a different material than used to form the main body of the part 400. In this example, the embedded indicium 410 can have a different density than the material of the part 400. In other examples, the embedded indicium 410 may be distinguishable from the material of the part 400 by any other suitable means (e.g., color, radioactivity, grain orientation, etc.).

In some examples, the embedded identification indicium 410 can be any suitable 3D shape. In some examples, the embedded identification indicium 410 can be used identify the part 100 by any suitable means (e.g., an ordering of materials, a 2D projection on a plane, the 3D structure, an orientation to a feature of the part 400). In the illustrated example, the embedded indicium 410 has the same projected cross-section on the plane 402 as the surface indicia 406. In other examples, the embedded indicium 410 can have a different cross-section than that of the surface indicium 406. In some examples, the embedded indicium 410 is detectable by an X-ray scanner. In some examples, the embedded indicium 410 is detectable by cutting the part 400.

The embedded identification indicium 410 aligns with the surface indicium 406 in such manner to allow the identification of the part 400. In the illustrated example, the linear alignment (e.g., the embedded indicium 410 and the surface indicium 406 have the same projected cross-section on the plane 402) of the surface indicium 406 to the embedded indicium 410 can be used to identify the part 400. In other examples, the embedded identification indicium 410 can align with one or more other surface indicia and/or embedded indicia in the part 400 to enable identification of the part 400 when examined (e.g., scanned by an X-ray scanner). In some examples, the orientation of surface indicium 406 to the embedded indicium 410 can be unique to the part 400 and, thus, act as a serial number of the part 400. In this example, other parts of the same model as the part 400 can have different orientations of the indicia.

Figure 5:
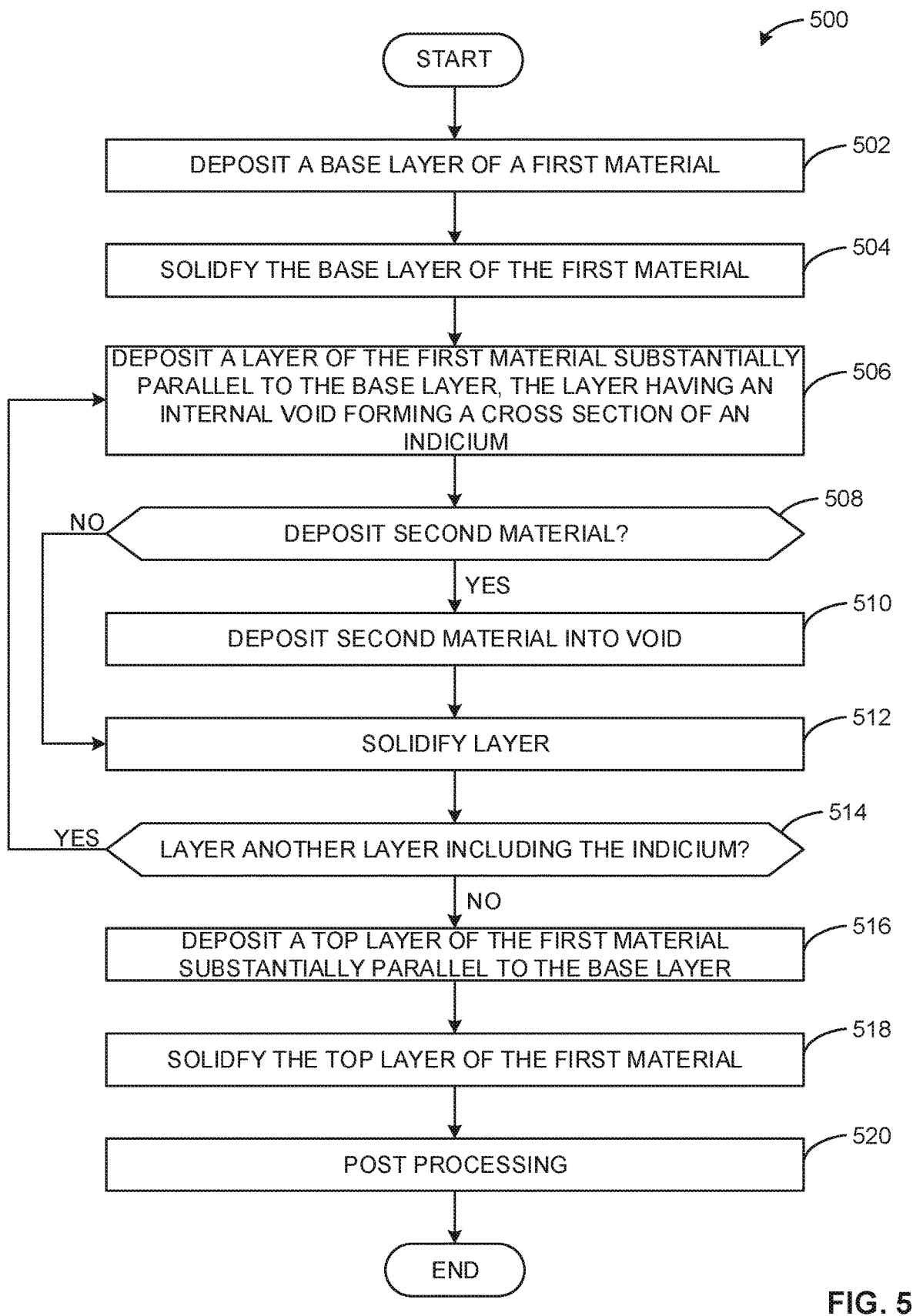
FIG. 5 is a flowchart representative of an example method of manufacturing the example additively manufactured parts of FIGS. 1 and 4.

FIG. 5 is a flowchart of an example method 500 that can be used to manufacture the part 100 of FIG. 1 and/or the part 400 of FIG. 4. The method 500 can be implemented using material extrusion techniques, material jetting techniques and/or any other suitable additive manufacturing techniques. As used herein, "substantially parallel" refers to measurements within three degrees to a reference plane (e.g., if a plane is substantially parallel to a reference plane, it is oriented between 3° and −3° relative to the reference plane).

The method 500 begins at block 502 by depositing a layer of a first material (e.g., the first material 104 of FIG. 1). For example, the first material can be drawn through a nozzle of a material extrusion apparatus, heated and deposited onto a base platform. Once the base layer has been deposited, the method 500 advances to block 504. At block 504, the base layer of the first material is solidified. For example, the base layer of the first material can solidify as it cools. In other examples, the base layer of the first material can be solidified by thermal, electric and/or any other suitable method (e.g., exposure to UV light). In some examples, the solidified base layer corresponds to a cross-section of the part 100. In some examples, the solidified base layer can include support material to be removed during post processing (e.g., block 520). In some examples, the base layer can be composed of multiple layers of the first material. Once the base layer has been deposited, the method 500 advances to block 506.

At block 506, another layer of the first material is deposited substantially parallel to the base layer, the layer having an internal void forming a cross-section of an indicium (e.g., the indicia 204-210 of FIG. 2). For example, the same process used to deposit the base layer can be used to deposit this layer. In other examples, any other suitable method can be used to deposit this layer. Once the layer has been deposited, the method 500 advances to block 508.

At block 508, if a second material is to be deposited, the method 500 advances to block 510. If a second material is not to be deposited (e.g., the formed indicium is to be a void), the method 500 advances to block 512. At block 510, a second material (e.g., the second material 202 of FIG. 2) is deposited and added to the layer deposited in block 506. In some examples, the second material is deposited in the void corresponding to the cross-section of the indicium. In some examples, block 506 and block 512 are executed concurrently. In some examples, the second material is deposited using the same technique used to deposit the first material in block 506 and/or block 502. In other examples, the second material is deposited using any other suitable method. In some examples, the second material can be the same material as the first material deposited with a different density (e.g., leaving small voids). In some examples, the second material can be support material (e.g., material deposited in a lattice to support subsequent layers, etc.).

At block 512, the layer (composed of the first material and/or the second material) is solidified. In some examples, the layer is solidified using the same technique used to solidify the base layer during the execution of block 504. In some examples, the first material and second material can be solidified separately (e.g., after or during the executions of block 506 and block 512, respectively). After the layer has been solidified, the method 500 advances to block 514.

At block 514, if another layer including the indicium is to be layered, the method 500 returns to block 506. If another layer including the indicium is not to be layered, the method 500 advances to block 516. At block 516, a top layer of the first material is deposited substantially parallel to the base layer. For example, the same process used to deposit the base layer can be used to deposit the top layer. In other examples, any other suitable method can be used to deposit the top layer. At block 518, the top layer of the first material is solidified. For example, the top layer can be solidified using the same technique used to solidify the base layer during the execution of block 504. In other examples, any other suitable method can be used to solidify the top layer. The method 500 then advances to block 520.

At block 520, the part is post-processed. For example, support material can be removed using machining, a chemical bath, etc. The part can undergo surface finishing such as sanding, painting, epoxy finish, polishing, vapor smoothing, electroplating, bead blasting, etc. In some examples, if the part was produced in smaller pieces, the part can be combined using cold welding. In some examples, surface indicia (e.g., the external indicium 406 of FIG. 4) can be added to the part. For example, a sticker can be adhered to the part. In some examples, surface indicia can be placed during the surface finishing of the part. Additionally, or alternatively, surface indicium can be etched into a surface of the part. In some examples, the part can be machined and/or added to an assembly.

Figure 6:
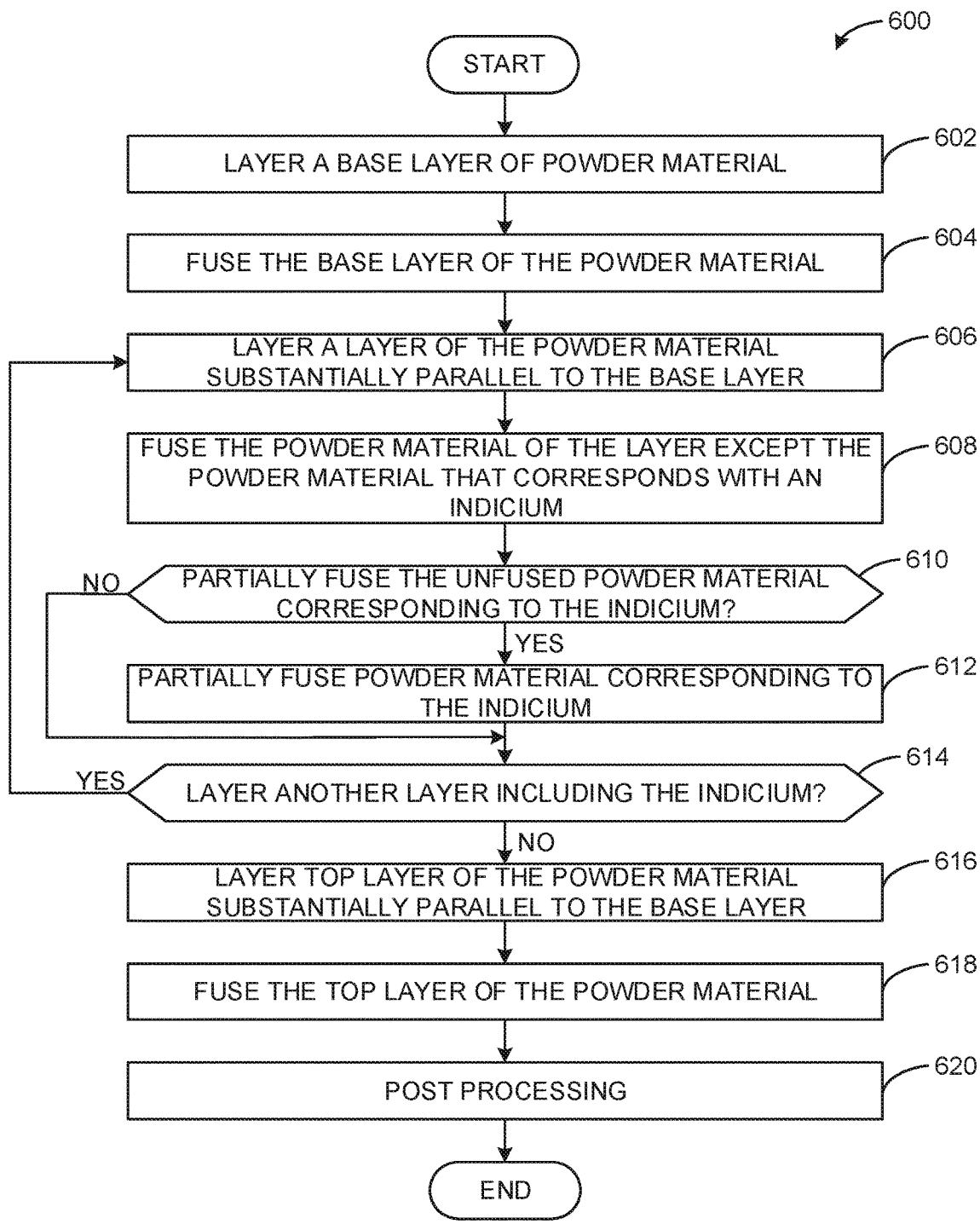
FIG. 6 is a flowchart representative of another example method of manufacturing the example additively manufactured parts of FIGS. 1 and 4.

FIG. 6 is a flowchart of an example method 600 that can be used to manufacture the part 100 of FIG. 1 and/or the part 400 of FIG. 4. The method 600 can implemented using binder jetting, powder bed fusion and/or any other suitable additive manufacturing techniques. The method 600 begins at block 602. At block 602, a base layer of powder material is layered. For example, a roller or blade can be used to evenly deposit a thin layer of powder (e.g., a powdered form of the first material of FIG. 1, such as plastic powders, metallic powders, etc.) onto a platform. In other examples, the powder is layered using any other suitable means. Once the powder has been distributed, the method 600 advances to block 604.

At block 604, the base layer of powder material is fused. For example, a laser, thermal printhead, and/or an electron beam can be used to selectively melt and fuse the powder. In other examples, a print head can be used to deposit an adhesive (e.g., glue, water, dyes, inks, etc.) to fuse the material. In some examples, the fused material corresponds to a cross-section of the completed part. In some examples, the unfused powder is removed from manufacturing platform. In other examples, all or some of the unfused material is not removed and acts as support material for subsequent layers. Once the material has been fused, the method 600 advances to block 606.

At block 606, another layer of the powder material is layered substantially parallel to the base layer. For example, the powder material can be layered using the same method used during the execution of block 602. In other examples, any other suitable method can be used to layer another layer of the powder material. At block 608, the powder material of the layer is fused, except the powder material that corresponds to an indicium. For example, the powder material can be fused using the same method used the during the execution of block 604. In other examples, any other suitable method can be used to fuse the powder. At block 608, if the unfused powder material corresponding to the indicium is to be partially fused, the method 600 advances to block 612. Otherwise, method 600 advances to block 614.

At block 612, the powder material corresponding to the indicium is partially fused. For example, the powder can be partially melted via a laser, electron beam and/or heat print head. In some examples, a print head can be used to deposit an adhesive (e.g., the adhesive used during the execution of block 608, a different adhesive, etc.) to partially fuse the material. In other examples, any suitable means of partially fusing the powder can be used. In some examples, the partially fused powder material can have a different density than the completely fused powder.

At block 614, if another layer including the indicium is to be layered, the method 600 returns to block 606. If another layer including the indicium is not to be layered, the method 600 advances to block 616. At block 616, the top layer of the powder material is layered. For example, the powder material can be layered using the same method used during the execution of block 602. In other examples, any other suitable method can be used to add another layer of the powder material. At block 608, the powder material of the layer fused. For example, the powder material can be fused using the same method used the during the execution of block 604. In other examples, any other suitable method can be used to fuse the powder.

At block 620, the part is post-processed. For example, external excess powder material can be removed using chemical treatments, compressed air, bead blasting etc. Internal support powder (e.g., the internal powder material) can be removed using escape holes or any other suitable means. The part can undergo a surface finish such as sanding, painting, dyeing, polishing, tumbling, electroplating, etc. In some examples, the part can undergo sintering, pressing, infiltration and/or any suitable method to improve the mechanical properties of the part. In some examples, surface indicia (e.g., the external indicium 406 of FIG. 4) can be added to the part. For example, a sticker can be adhered to the part. In some examples, surface indicia can be placed during surface finishing the part. Additionally, or alternatively, surface indicium can be etched into the surface. In some examples, the part can be machined and/or added to an assembly.

Figure 7:
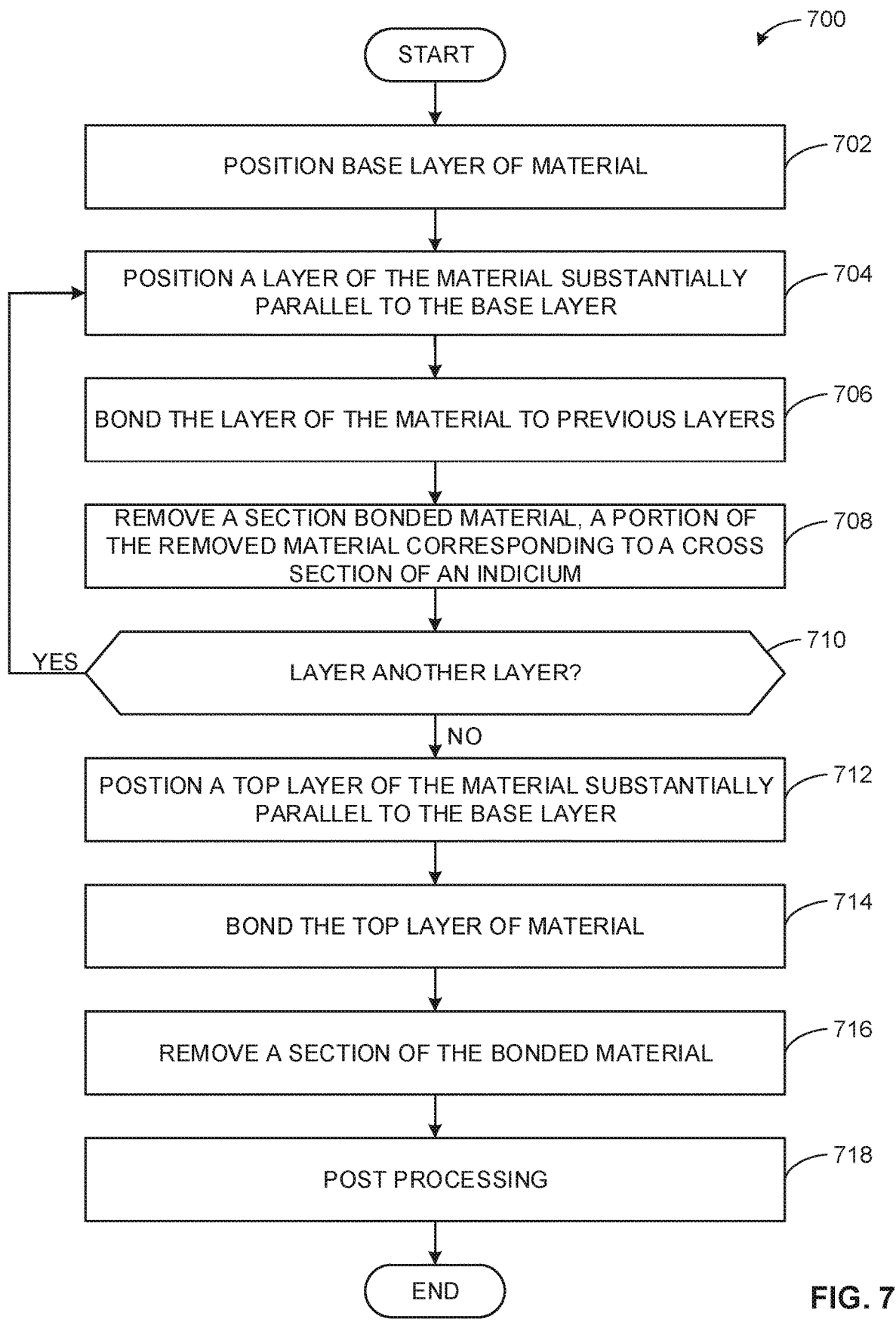
FIG. 7 is a flowchart representative of another example method of manufacturing the example additively manufactured parts of FIGS. 1 and 4.

FIG. 7 is a flowchart of an example method 700 that can be used to manufacture the part 100 of FIG. 1 and/or the part 400 of FIG. 4. The method 700 can be implemented using sheet lamination and/or any other suitable additive manufacturing techniques. The method 700 begins at block 702. At block 702, the base layer of material is positioned. For example, a roller can be used to position a base layer of material (e.g., paper, a metal plate, a metal foil, etc.) onto a platform. In other examples, any other suitable method of positioning the base layer of material in place can be used. In some examples, the base layer can be adhered to the platform. After the base layer of material has been placed, the method 700 advances to block 704.

At block 704, a layer of material is layered substantially parallel to the layer. For example, a roller can be used to position the layer over the base layer. In some examples, the layer is thinner than the base layer. At block 706, the layered layers are bonded to the previously layer(s). For example, an adhesive (e.g., glue, etc.) can be used to adhere the layer to the previous layer(s). In some examples, ultrasonic vibrations, deformation, and/or pressure can be used to bond the layers together. Once the layers have been bonded together, the method 700 advances to block 708.

At block 708, a section of the bonded material is removed, a portion of this removed material corresponding to a cross-section of an indicium. For example, a laser or knife can be used to remove the bonded material. In some examples, computer numerical control (CNC) machining can be used to remove the bonded material. In some examples, the removed material is removed from the work platform using vibrations and/or compressed air.

At block 710, if another layer including the indicium is to be layered, the method 700 returns to block 704. If another layer including the indicium is not to be layered, the method 700 advances to block 712. At block 712, a top layer of the material is positioned substantially parallel to the base layer. For example, a roller can be used to position the top layer over the base layer. In some examples, the layer is thinner than the base layer. At block 714, the layered top layer(s) is bonded to the previously layers. For example, an adhesive (e.g., glue, etc.) can be used to adhere the layer to the previous layer(s). In some examples, ultrasonic vibrations, deformation, and/or pressure can be used to bond the layers together. Once the top layer has been bonded to the part, the method 700 advances to block 716.

At block 716, a section of the bond material is removed. For example, a laser or knife can be used to remove the bond material. In some examples, a computer numerical control (CNC) machining can be used to remove the bonded material. In some examples, the removed material is removed from the work platform using vibrations and/or compressed air.

At block 718, the part is post-processed. For example, the part can undergo additional machining to shape the part. The part can undergo a surface finish such as sanding, painting, dyeing, polishing, tumbling, electroplating, etc. In some examples, surface indicia (e.g., the external indicium 406 of FIG. 4) can be added to the part. For example, a sticker can be adhered to the part. In some examples, surface indicia can be placed during surface finishing the part. Additionally, or alternatively, surface indicium can be etched into the surface. In some examples, the part can be machined and/or added to an assembly.

Although the example methods 500, 600, 700 are described with reference to the flowcharts illustrated in FIGS. 5, 6 and 7, respectively, many other methods of manufacturing the example parts 100, 400 in accordance with the teachings disclosed herein can alternatively be used. For example, the order of execution of the blocks can be changed, and/or some of the blocks described can be changed, eliminated or combined. Similarly, additional operations can be included in the manufacturing process before, in between or after the blocks shown in FIGS. 5, 7 and/or 8.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C From the foregoing, it will be appreciated that example methods, apparatus and articles of manufacture have been disclosed that allow for the identification and authentication of parts manufactured using additive manufacturing. The examples disclosed herein allow for identification indicium to be hidden within the parts which prevents part counterfeiters from easily counterfeiting the parts including the embedded indicia.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
a body formed via an additive manufacturing process, the body composed of a first material having a first density, the body including an external surface, the external surface defining a surface plane of the body;
a first indicium formed via the additive manufacturing process, the first indicium embedded internally in the body and configured as a void, the first indicium located at an intersecting plane extending through the body, the intersecting plane spaced apart from and oriented parallel to the surface plane; and
a second indicium located on the external surface of the body at the surface plane, the second indicium spaced apart from and linearly aligned with the first indicium along an axis of the body extending through the surface plane and the intersecting plane, the linear alignment between the first and second indicium enabling an identification of the apparatus.

2. The apparatus of claim 1, wherein the void is filled with a second material, the second material having a second density, the second density different than the first density.

3. The apparatus of claim 2, wherein the first material is completely fused powder material and the second material is a not completely fused powder material.

4. The apparatus of claim 2, wherein the second material is a support material.

5. The apparatus of claim 2, wherein the second material is a same material as the first material, the second material having the second density.

6. The apparatus of claim 1, wherein the first indicium is at least one of a logo, a serial number, a trademark, a barcode, or a QR code.

7. The apparatus of claim 1, wherein the second indicium is at least one of a watermark, a hologram,. or an etching.

8. The apparatus of claim 1, wherein the void is filled with a second material, the first material having a first grain orientation, the second material having a second grain orientation, the second grain orientation different than the first grain orientation.

9. The apparatus of claim 1, wherein the void is filled with a second material, the first material having a first radioactivity, the second material having a second radioactivity, the second radioactivity different than the first radioactivity.

10. The apparatus of claim 2, wherein the first material is a powder material fused with a first adhesive.

11. The apparatus of claim 10, wherein the second material is not completely fused with a second adhesive.

12. The apparatus of claim 1, wherein a cross-sectional shape of the second indicium along the surface plane matches a cross-sectional shape of the first indicium along the intersecting plane.

13. The apparatus of claim 1, wherein the first indicium has a projected cross-sectional shape on the surface plane that matches a cross-sectional shape of the second indicium on the surface plane.

14. The apparatus of claim 1, wherein the second indicium is included on a sticker, the sticker adhered to the external surface using an adhesive.

15. The apparatus of claim 1, wherein the second indicium is etched into the external surface.

16. The apparatus of claim 2, wherein the first indicium is a QR code composed of the first material and the second material arranged as rectangular prisms.

17. An apparatus, comprising:
a body formed via an additive manufacturing process, the body composed of a first material having a first density, the body including an external surface, the external surface defining a surface plane of the body;
a first indicium formed via the additive manufacturing process, the first indicium embedded internally in the body, the first indicium composed of a second material having a second density, the first indicium located at an intersecting plane extending through the body, the intersecting plane spaced apart from and oriented parallel to the surface plane; and
a second indicium located on the external surface of the body at the surface plane, the second indicium spaced apart from and linearly aligned with the first indicium along an axis of the body extending through the surface plane and the intersecting plane, the linear alignment between the first and second indicium enabling an identification of the apparatus.

18. The apparatus of claim 17, wherein a cross-sectional shape of the second indicium along the surface plane matches a cross-sectional shape of the first indicium along the intersecting plane.

19. The apparatus of claim 17, wherein the first indicium has a projected cross-sectional shape on the surface plane that matches a cross-sectional shape of the second indicium on the surface plane.

20. The apparatus of claim 17, wherein the second indicium is included on a sticker, the sticker adhered to the external surface of the body using an adhesive.

21. The apparatus of claim 17, wherein the second indicium is etched into the external surface of the body.

22. The apparatus of claim 17, wherein the first indicium is a QR code composed of the first material and the second material arranged as rectangular prisms.

* * * * *

UNITED STATES PATENT AND TRADEMARK OFFICE
CERTIFICATE OF CORRECTION

PATENT NO. : 11,504,902 B2
APPLICATION NO. : 16/584565
DATED : November 22, 2022
INVENTOR(S) : Adam Taylor Boyle It is certified that error appears in the above-identified patent and that said Letters Patent is hereby corrected as shown below:

In the Drawings

On sheet 5, in figure 5, in field "504", replace "SOLIDFY" with --SOLIDIFY--.
On sheet 5, in figure 5, in field "518", replace "SOLIDFY" with --SOLIDIFY--.

Signed and Sealed this
Fourteenth Day of March, 2023

Katherine Kelly Vidal
*Director of the United States Patent and Trademark Office*